June 23, 1964
W. A. PITTS
3,138,425
RECORDER APPARATUS
Filed Dec. 26, 1961
4 Sheets-Sheet 1
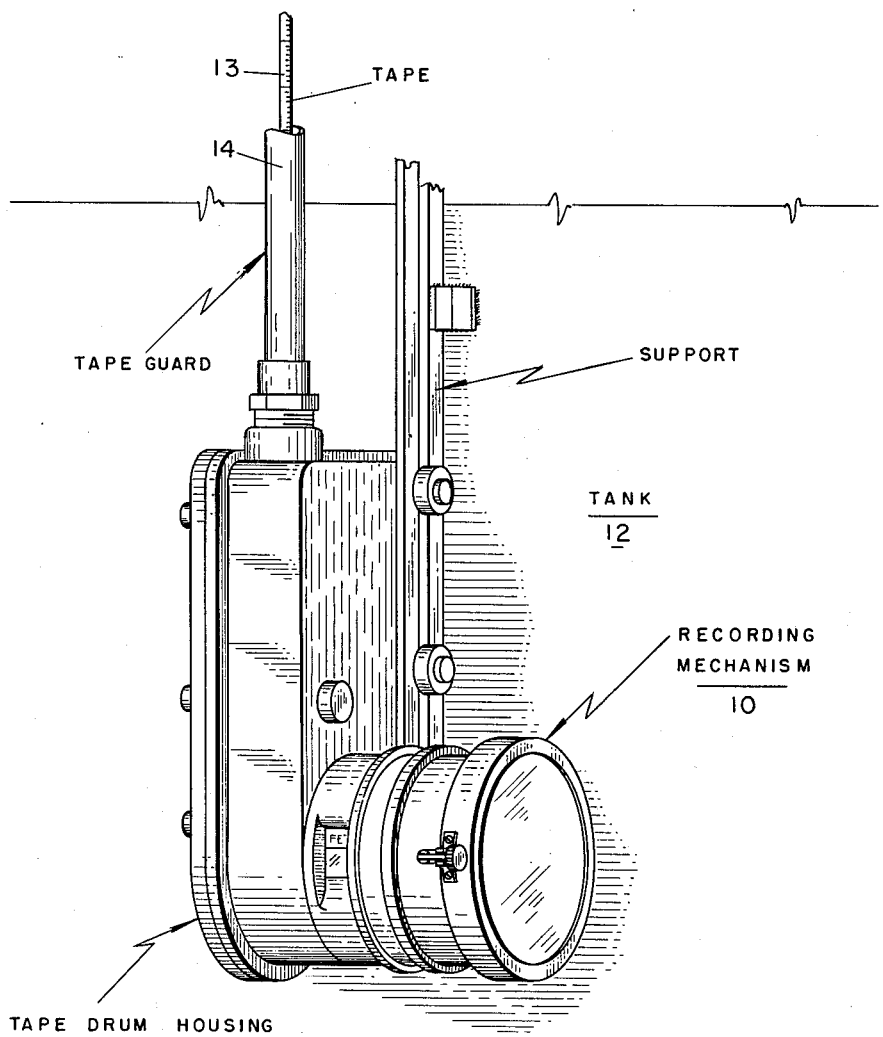
FIG. I.
INVENTOR.
WILLIAM A. PITTS,
BY John J. Schneider
ATTORNEY.

June 23, 1964   W. A. PITTS   3,138,425
RECORDER APPARATUS
Filed Dec. 26, 1961   4 Sheets-Sheet 2
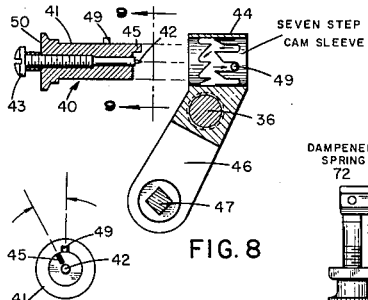
FIG. 8
FIG. 9.
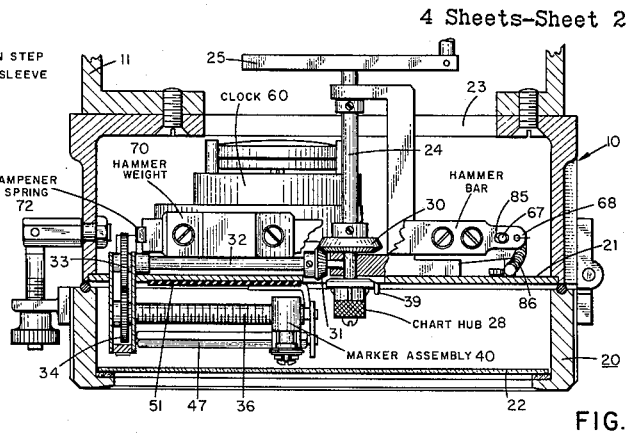
FIG. 2.
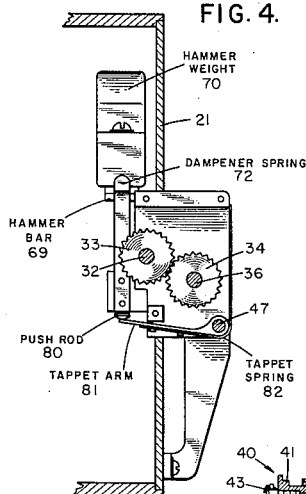
FIG. 4.
FIG. 5.
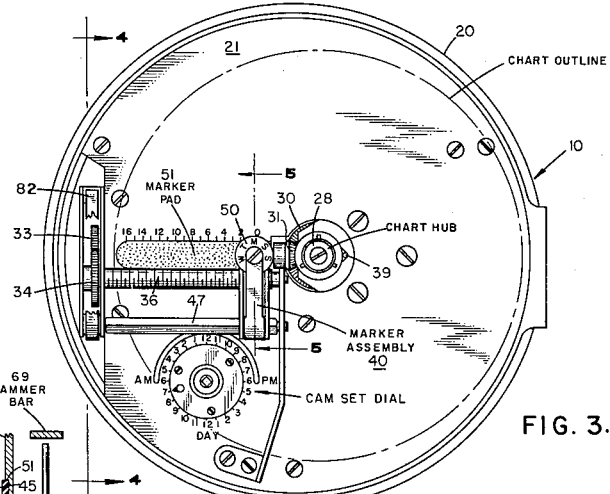
FIG. 3.
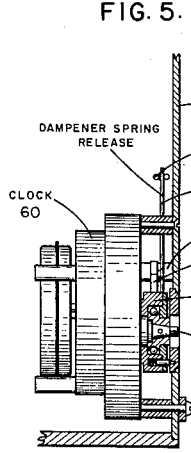
FIG. 7.
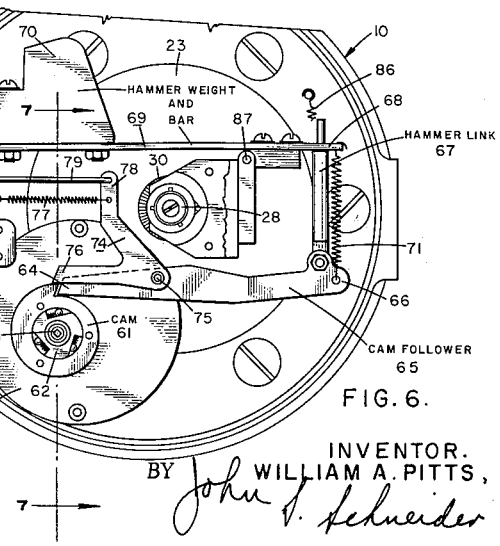
FIG. 6.
INVENTOR.
WILLIAM A. PITTS,
BY John V. Schneider
ATTORNEY.

June 23, 1964     W. A. PITTS     3,138,425
RECORDER APPARATUS

Filed Dec. 26, 1961     4 Sheets-Sheet 3

INVENTOR.
WILLIAM A. PITTS,
BY
ATTORNEY.

June 23, 1964     W. A. PITTS     3,138,425
RECORDER APPARATUS

Filed Dec. 26, 1961                         4 Sheets-Sheet 4

INVENTOR.
WILLIAM A. PITTS,
BY John S. Schneider
ATTORNEY.

3,138,425
RECORDER APPARATUS
William A. Pitts, Bellaire, Tex., assignor, by mesne assignments, to Jersey Production Research Company, Tulsa, Okla., a corporation of Delaware
Filed Dec. 26, 1961, Ser. No. 161,885
6 Claims. (Cl. 346—50)

The present invention concerns apparatus for automatically and accurately recording conditions such as the occurrence of variable events and in particular apparatus for recording such events on a circular chart in a manner such that the circumference and radius of the chart, together, determine the magnitude of the event. This apparatus also includes means for permitting identification of each instantaneously, sequentially recorded event.

Essentially, the recorder comprises two principal mechanisms: (1) a rotatable chart and movable marker assembly geared to move synchronously and (2) a chart marking device including mark identification means. The chart has on its face concentric circles and radial lines dividing the chart into segments. The concentric circles represent units of the event being recorded, and the radial lines represent increments of the units.

When the events to be recorded are levels of liquid in a tank, which is the application of the apparatus described herein to illustrate the use of the recorder, the concentric circles represent feet and the radial lines represent inches and fractions of inches. Rotation of the chart and simultaneous movement of the marker assembly in response to changes in the liquid level within the tank locate the marker assembly at a point on the chart that indicates accurately the particular liquid level in the tank in feet and inches. In addition, the instantaneous sequentially made recordings are each identifiable one from another.

Objects and advantages of this apparatus will be apparent from a more complete description of the invention when taken with the drawings wherein:

FIG. 1 is an isometric view showing the recorder apparatus of the invention in operating position;

FIG. 2 is a plan view, partly in section, of the recorder apparatus;

FIG. 3 is a front view of the apparatus of FIG. 2;

FIG. 4 is a sectional view taken on lines 4—4 of FIG. 3;

FIG. 5 is a sectional view taken on lines 5—5 of FIG. 3;

FIG. 6 is a front view of the clock and hammer linkage of FIG. 2;

FIG. 7 is a view taken on lines 7—7 of FIG. 6;

FIG. 8 is an enlarged view of the movable head, carriage, and cam sleeve of FIG. 5;

FIG. 9 is a view taken on lines 9—9 of FIG. 8;

Figure 10:
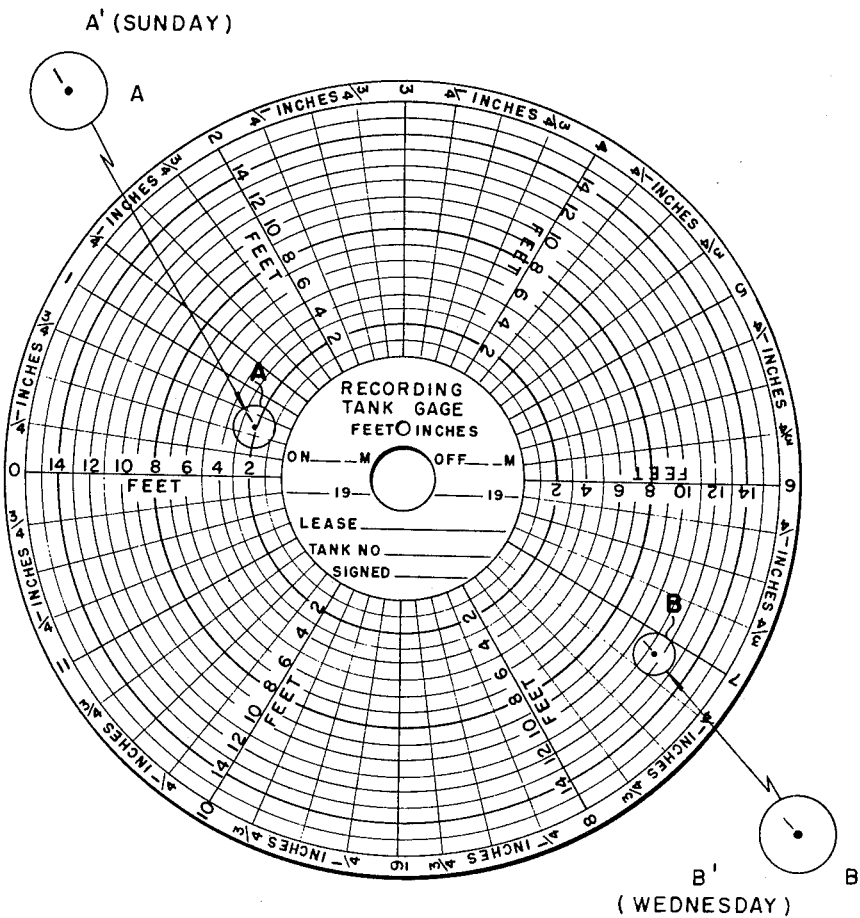
FIG. 10 is a view of a representative chart to be used.

Referring to the drawings in greater detail for a more complete description of the invention, in FIG. 1 is shown recording apparatus 10 connected to a conventional ground-level gauge 11, which is supported on a lease tank 12. Gauge 11 includes a direct-drive output shaft and a tape reel mechanism (not shown) and a recording tape 13 (shown protruding from a tube 14) connected at one end to a float in tank 12 and wrapped on the reel mechanism at the other end thereof for rotating the output shaft in response to changes of the liquid level in tank 12.

The details of recorder 10 are shown in FIGS. 2-9, inclusive. Referring to FIGS. 2 and 3 in particular, a housing 20 divided by a partition member 21 is provided with a removable door 22 at its front (in FIG. 3 the door is removed) and an opening 23 at its rear through which an input drive shaft 24 extends. Exterior of housing 20, one end of input shaft 24 is coupled to tape 13 through the aforementioned output shaft and tape reel mechanism and also a gauge coupling member 25. A hub 28 for positioning and maintaining in place a paper chart 37 (see FIG. 10) is mounted on the other end of shaft 24. A positioning pin 39 is provided on hub 28 to insure proper orientation of the chart. Also mounted on shaft 24 adjacent hub 28 is a bevel gear 30, which meshes with a bevel gear 31 mounted on a shaft 32. A spur gear 33 is mounted on shaft 32, and it meshes with another spur gear 34 mounted on the shaft of a lead screw 36.

In FIGS. 2, 3, 5, 8, and 9, a marker assembly or carriage 40 is shown, and it includes a rotatable marker head 41 also movable toward and retractable from chart 37; a center point shaft 42 threaded into head 41, as shown; a "satellite" blade 45 positioned on the forward face of head 41; a seven-step grooved cam 44 arranged about head 41; a carriage body 46, containing cam 44 and supporting head 41 and a marker head arm 48, arranged for movement by means of screw 36 along a square torsion bar 47—the lower end of marker head arm 48 is secured to bar 47 and the upper end is connected to center point shaft 42 by screw head 43; a cam follower pin 49 arranged on head 41 for movement within the grooves of cam 44; and a day dial 50 positioned on the rearward face of head 41. A marker pad 51 is positioned on partition 21 adjacent marker assembly 40.

Now referring more particularly to FIGS. 2, 4, 6, and 7, the marker actuating mechanism includes a clock 60, which operates to rotate a cam 61 through a clutch 62 mounted on a shaft 63. One end 64 of a cam follower 65 pivotally mounted at 75 rides the surface of cam 61, and the other end 66 has pivotally arranged on it a hammer link 67, the upper end of which extends through an opening 85 in one end 68 of a hammer bar 69 pivotally mounted as at 87 on the other end 73 of which is fastened a hammer weight 70. An overtravel spring 71 is connected between cam follower end 66 and hammer bar end 68. Another spring 86 is connected between partition 21 and end 66 of cam follower 65. A dampener spring 72 restrains upward movement of end 73 of hammer bar 69. Spring 72 is released through the action of a second cam follower 74 pivotal at 75, one end 76 of which is urged against the surface of cam 61 by a spring 77 and to the other end 78 of which is connected a dampener spring release bar 79.

A push rod 80 engages at its lower end a tappet 81, which is secured to torsion rod 47. A tappet spring 82 is arranged on tappet arm 81.

As seen in detail in FIG. 10, paper chart 37 (an outline of which is indicated in FIG. 3) has concentric circles ⅛ inch apart representing 1-foot increments of liquid level in tank 12 from 0 to 16 feet and radial lines dividing the chart circles into segments representing inches and fractions of an inch of liquid level. Shaft 24 coupled to the shaft of the ground level gauge turns one revolution per one foot change of liquid level. Through bevel gears 30-31 and spur gears 33-34 and lead screw 36, marker assembly 40 is moved along rod 47 by rotation of shaft 24. When liquids are added to the tank, chart 37 will rotate counterclockwise and marker assembly 40 will move to the left as seen in FIG. 3 along lead screw 36 and toward the outer edge of the chart. When liquids are removed from the tank, the opposite rotation of the chart and movement of the marker assembly will occur. Rotation of the chart and simultaneous movement of the marker assembly responsive to the liquid level in tank 12 places center point shaft 42 at the point on chart 37 that indicates that particular level. Changes in liquid level correspondingly change the location of marker assembly 40 and shaft 42 relative to the chart so that at all times the marker assembly is located at that point on the chart that is indicative of the liquid level in tank 12.

In FIG. 10 two examples illustrate the method of liquid level indication. Point A is just outside the 2-foot circle and is about halfway between the 0-½-inch and 0-¾-inch lines. Therefore, point A indicates 2 feet and 0-⅝ inches of liquid level. Blade marker A' for point A indicates the mark was made on Sunday. Point B is between the 11-foot and 12-foot circles and is between the 7-inch and 7¼-inch lines, and thereby indicates a liquid level of 11 feet and 7⅛ inches. Blade marker B' for point B indicates the mark was made on Wednesday. The days refer to a preferred operation, i.e., to record liquid levels automatically at a specified time, e.g., 7 a.m. each day for one week, i.e., seven days. The clock mechanism makes these recordings and identifies each one so that one day's level is distinguishable from the next day's level. Thus, clock 60 rotates clock shaft 63, which causes cam 61 to rotate and in turn raises the ends 64 and 76 of cam followers 65 and 74, respectively. When end 64 of cam follower 65 raises, end 68 of bar 69 is pulled downwardly by overtravel spring 71; and as a result, hammer weight 70 on the end 73 of bar 69 is raised. Cam 61 rotates once per day at a constant rate of speed. At 7 a.m. the peak of cam 61 passes end 64 of cam follower 65, allowing the follower end 64 to drop. The drop is greatly accelerated by tension spring 86. As end 64 falls, hammer link 67 is driven upwardly and causes end 73 of hammer bar 69 carrying weight 70 to be thrown downward against push rod 80. After cam follower 65 has stopped, hammer 70 continues its downward movement stretching overtravel spring 71 and moving until it is stopped by completion of the downward movement of push rod 80. Hammer 70 and end 73 of bar 69 are withdrawn by the tension in overtravel spring 71. Dampener springs 72 prevents oscillation or bouncing of hammer 70. This spring latches onto the end 73 of bar 69. It is released by the action of cam follower 74. When end 76 drops just after the end 64 of cam follower 65 drops, the other end 78 pushes rod 79 against spring 72 and releases bar 69 to permit cam 61 to again slowly raise weight 70 to its drop position.

When push rod 80 is forced downwardly by the hammer blow, it pivots tappet arm 81 and turns torsion rod 47, thereby rotating marker head arm 48. This action moves center point shaft 42 and satellite blade 45 forward against chart 37, puncturing the chart, which is backed by rubber marking pad 51. The puncture made with center point 42 records the 7 a.m. liquid level in tank 12, while the cut made by satellite blade 45, which is arranged radially to the center point, identifies the day of the week. Immediately following withdrawal of hammer 70, tappet spring 82 retracts tappet arm 81, which turns bar 47, causing marker head 41 to withdraw from the chart and the center shaft point and satellite blade to recede into marker assembly 40.

Satellite blade 45 is positioned angularly about the center point 42 by the guide surfaces provided in cam 44 for cam follower pin 49. Each time marker head 41 is actuated by hammer weight 70, cam 44 causes satellite blade 45 to advance ⅐ revolution (one day) about the center point. Thereby, each day of the week is distinguished by the particular angular position of its mark. On day dial 50 is marked "M, T, W, T, F, S, S," as seen in FIG. 3, which indicates the days of the week. After each 7 a.m. recording is made, the day that was recorded is at the top of the day dial. Day dial 50 can be reset manually by pressing and releasing marking head 41 to cause the desired day to be indicated. This, of course, properly positions satellite blade 45 as well.

Figure 11:
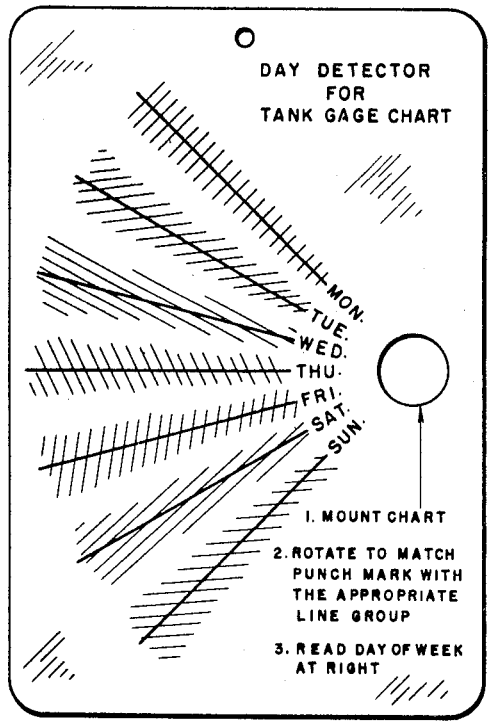
FIG. 11 is a view of a chart scanner that may be used to aid in identification of daily punctures.

In FIG. 11 a transparent plastic scanner that buttons on the center of the chart may be used to aid in identifying the days indicated by the satellite cuts. The scanner has a separate group of parallel lines for each day, sloped as the satellite cut for that day is sloped. As noted in the instructions on the scanner, it is rotated to match the punch mark with the appropriate line group, and the day of the week then is read from the scanner.

Figure 12:
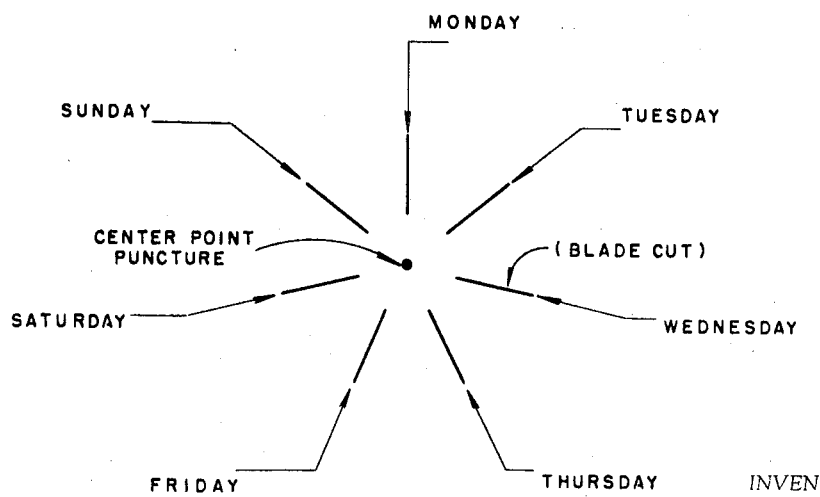
FIG. 12 is an enlarged view of a 7-day puncture pattern.

In FIG. 12 is shown an enlargement of a composite puncture pattern such as will result if there is no change of liquid level in 7 days. The days are identified on the illustration.

Having fully described the elements, nature, operation, and objects of my invention, I claim:

1. Apparatus for automatically recording at selected times the level of liquid in a tank comprising:

a shaft rotatable in response to changes in said liquid level;

a circular, rotatable recorder chart mounted on said shaft and having on one face thereof concentric circular lines representing the liquid level in particular units and radial lines dividing said circular chart into segments representing increments of said units;

a rotatable bar arranged along the face of said chart;

a radially movable marker mounted on said bar for pivotal movement therewith from a chart non-marking to a chart marking position and vice versa and geared to said shaft in a manner such that said chart and said marker rotate and move radially, respectively, simultaneously in response to rotations of said shaft and thereby in response to changes in said liquid level to position said marker relative to the circular and radial lines of said chart so that when said marker is in chart marking position, the instantaneous value of said liquid level is recorded on said chart;

marker operating means connected to said bar for rotating said bar and thereby pivoting said marker to its marking position;

spring means connected to said operating means for biasing said bar and thereby said marker to its non-marking position;

actuator means for actuating said operating means to move said marker to its marking position against the bias of said spring means; and clock-operated means connected to said actuator means for actuating it at selected intervals.

2. Apparatus for automatically recording at selected times the level of liquid in a tank comprising:

a shaft rotatable in response to changes in said liquid level;

a circular, rotatable recorder chart mounted on said shaft and having on one face thereof concentric circular lines representing the liquid level in particular units and radial lines dividing said circular chart into segments representing increments of said units;

a rotatable bar arranged along the face of said chart;

a radially movable and rotatable marker mounted on said bar for pivotal movement therewith from a chart non-marking to a chart marking position and vice versa and geared to said shaft in a manner such that said chart and said marker rotate and move radially, respectively, simultaneously in response to rotations of said shaft and thereby in response to changes in said liquid level to position said marker relative to the circular and radial lines of said chart so that when said marker is in chart marking position, the instantaneous value of said liquid level is recorded on said chart;

marker operating means connected to said bar for rotating said bar and thereby pivoting said marker to its marking position;

spring means connected to said operating means for biasing said bar and thereby said marker to its non-marking position;

actuator means for actuating said operating means to move said marker to its marking position against the bias of said spring means;

clock-operated means connected to said actuator means for actuating it at selected intervals;

a cam having guide surfaces and surrounding said marker and stationary relative to rotational and pivotal movement of said marker;

said marker being provided with a center point mark and a line "satellite" mark spaced radially from said point mark; and a cam rider arranged on said marker for movement on the guide surfaces of said cam in a manner such that each pivotal movement of said marker to its marking position from its non-marking position and vice versa causes said cam rider to traverse said cam guide surfaces and rotate said marker and satellite mark a selected amount.

3. Apparatus for automatically recording at selected times the level of liquid in a tank comprising:

a shaft rotatable in response to changes in said liquid level;

a circular, rotatable recorder chart mounted on said shaft and having on one face thereof concentric circular lines representing the liquid level in particular units and radial lines dividing said circular chart into segments representing increments of said units;

a rotatable bar arranged along the face of said chart;

a radially movable and rotatable marker mounted on said bar for pivotal movement therewith from a chart non-marking to a chart marking position and vice versa and geared to said shaft in a manner such that said chart and said marker rotate and move radially, respectively, simultaneously in response to rotations of said shaft and thereby in response to changes in said liquid level to position said marker relative to the circular and radial lines of said chart so that when said marker is in chart marking position the instantaneous value of said liquid level is recorded on said chart;

a marker operating means connected to said bar for rotating said bar and thereby pivoting said marker to its marking position;

spring means connected to said operating means for biasing said bar and thereby said marker to its non-marking position;

actuator means for actuating said operating means to move said marker to its marking position against the bias of said spring means;

clock-operated means connected to said actuator means for actuating it at selected intervals;

a cam having guide surfaces and surrounding said marker and stationary relative to rotational and pivotal movement of said marker;

said marker being provided with a center point mark and a line "satellite" mark spaced radially from said point mark;

a cam rider arranged on said marker for movement on the guide surfaces of said cam in a manner such that each pivotal movement of said marker to its marking position from its non-marking position and vice versa causes said cam rider to traverse said cam guide surfaces and rotate said marker and satellite mark a selected amount;

said clock-operated means including a rotatable cam connected to said clock;

a cam follower movable in response to rotation of said rotatable cam; and a weight connected to said cam follower whereby said cam follower raises said weight as said rotatable cam rotates and allows it to drop and strike and actuate said actuator means at selected intervals as determined by the configuration of said cam surface.

4. Apparatus for automatically recording a measurable, variable factor such as temperature, pressure, liquid level, etc. comprising:

a shaft rotatable in response to variations in said factor;

a rotatable recorder chart mounted on said shaft and provided with circular lines representing particular measurable units of said factor and radial lines dividing said chart into segments representing increments of said units;

a radially movable marker arranged for pivotal movement from a chart non-marking to a chart marking position and vice versa and geared to said shaft in a manner such that said chart and said marker rotate and move radially, respectively, simultaneously in response to rotations of said shaft and thereby in response to changes in said factor to position said marker relative to the circular and radial lines of said chart so that when said marker is in chart marking position the instantaneous value of said factor is recorded;

marker operating means for pivoting said marker to its marking position;

biasing means connected to said operating means for urging said marker to its non-marking position;

means for actuating said operating means to move said marker to its marking position against the bias of said biasing means; and means connected to said actuating means for actuating it at selected intervals.

5. Apparatus for automatically recording a measurable, variable factor such as temperature, pressure, liquid level, etc. comprising:

a shaft rotatable in response to variations in said factor;

a rotatable recorder chart mounted on said shaft and provided with circular lines representing particular measurable units for said factor and radial lines dividing said chart into segments representing increments of said units;

a radially movable and rotatable marker arranged for pivotal movement from a chart non-marking to a chart marking position and vice versa and geared to said shaft in a manner such that said chart and said marker rotate and move radially, respectively, simultaneously in response to rotations of said shaft and thereby in response to changes in said factor to position said marker relative to the circular and radial lines of said chart so that when said marker is in chart marking position the instantaneous value of said factor is recorded;

marker operating means for pivoting said marker to its operating position;

biasing means connected to said operating means for urging said marker to its non-marking position;

means for actuating said operating means to move said marker to its marking position against the bias of said biasing means;

timer means connected to said actuating means for actuating it at selected intervals;

a cam having guide surfaces and surrounding said marker and stationary relative to rotational and pivotal movement of said marker;

said marker being provided with a center point mark and a line satellite mark spaced radially from said point mark; and a cam rider arranged on said marker for movement on the guide surfaces of said cam in a manner such that each pivotal movement of said marker to its marking position from its non-marking position and vice versa causes said cam rider to traverse said cam guide surfaces and rotate said marker and "satellite" mark a selected amount.

6. Apparatus for automatically recording a measurable, variable factor such as temperature, pressure, liquid level, etc. comprising:

a shaft rotatable in response to variations in said factor;

a rotatable recorder chart mounted on said shaft and provided with circular lines representing particular measurable units of said factor and radial lines dividing said chart into segments representing increments of said units;

a radially movable and rotatable marker arranged for pivotal movement from a chart non-marking to a chart marking position and vice versa and geared to said shaft in a manner such that said chart and said marker rotate and move radially, respectively, simultaneously in response to rotations of said shaft and thereby in response to changes in said factor to position said marker relative to the circular and radial lines of said chart so that when said marker is in chart marking position the instantaneous value of said factor is recorded;

marker operating means for pivoting said marker to its marking position;

biasing means connected to said operating means for urging said marker to its non-marking position;

means for actuating said operating means to move said marker to its marking position against the bias of said biasing means;

means connected to said actuating means for actuating it at selected intervals;

a cam having guide surfaces and surrounding said marker and stationary relative to rotational and pivotal movement of said marker;

said marker being provided with a center point mark and a line satellite mark spaced radially from said point mark;

a cam rider arranged on said marker for movement on the guide surfaces of said cam in a manner such that each pivotal movement of said marker to its marking position from its non-marking position and vice versa causes said cam rider to traverse said cam guide surfaces and rotate said marker and "satellite" mark a selected amount;

said timer means including a clock;

a rotatable cam connected to said clock;

a cam follower movable in response to rotation of said rotatable cam; and a weight connected to said cam follower whereby said cam follower raises said weight as said rotatable cam rotates and allows it to drop and strike and actuate said actuator means at selected intervals as determined by the configuration of said cam surface.

References Cited in the file of this patent

UNITED STATES PATENTS

| | | |
|---|---|---|
| 686,055 | Wolfe | Oct. 15, 1907 |
| 1,422,477 | Pullman | July 11, 1922 |
| 2,588,102 | Forero | Mar. 4, 1952 |